United States Patent Office 2,785,102
Patented Mar. 12, 1957

2,785,102

FUNGICIDAL COMPOSITIONS

Waldo B. Ligett, Pontiac, and Rex D. Closson, Detroit, Mich., and Calvin N. Wolf, New York, N. Y., assignors to Ethyl Corporation, New York, N. Y., a corporation of Delaware No Drawing. Application March 25, 1954,
Serial No. 418,770

4 Claims. (Cl. 167—33)

This invention relates to substituted succinhydrazides. In particular our invention relates to a class of compounds which have utility as fungitoxicants, methods of formulating such compounds into useful fungicides, and methods of their application. This application is a continuation-in-part of our copending application Serial Number 350,772, now abandoned, which in turn is a continuation-in-part of our copending application Serial Number 192,806, filed October 28, 1950, which has now matured into U. S. Patent 2,640,005.

The compounds comprising the active ingredients of the formulations of our invention comprise the class of mono- and di-substituted 1,2,4,5-tetrahydropyridazine-3,6-diones and are characterized by being potent biocides, being particularly effective against fungus organisms. These compounds can be described by the general formula

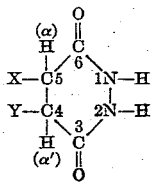

wherein the substituents X and Y are the same or different and are selected from hydrogen and negative radicals, but not more than one of X or Y is hydrogen. Among the negative radicals which comprise certain embodiments of the novel compounds of our invention we include the sulfhydryl group (—SH), mercaptans (—SR), the trichloromethylthio (—SCCL₃) group, alkyl- and aryloxy, acyloxy and aroyloxy (RCOO—), nitroso, nitro, amino, and mono- and di-substituted amino.

Correct nomenclature for the compounds of this invention requires that they be referred to as derivatives of 1,2,4,5-tetrahydropyridazine-3,6-dione, wherein one or more substituents are substituted in the 4-, or 4,5-positions, that is, at least one of the methylene groups is substituted. However, for the sake of brevity we can refer to the compounds of our invention as substituted succinhydrazides. Thus, our compounds are referred to as α-, and α,α'-substituted succinhydrazides.

The compounds of this invention are solids of fairly high melting point, usually above 50° C. They contain carbon, hydrogen, oxygen, nitrogen, and in some cases sulfur and halogen atoms. They are somewhat acid in nature and form salts with strong alkali. They tend to hydrolyze on contact with water, particularly on prolonged contact at higher temperatures. With certain substituents on the methylene carbon atoms, such as the amino radical, this acidity is counteracted to some extent by the alkalinity of the substituent group. The compounds of this invention are quite reactive and undergo a variety of chemical reactions.

One method of synthesizing the substituted succinhydrazides of this invention comprises treating hydrazine or hydrazine hydrate with the anhydride of the appropriately substituted succinic acid. Reaction proceeds readily in most cases, and requires the use of a solvent to moderate the exothermic reaction.

The following examples, wherein all parts and percentages are on the weight basis, describe the preparation of typical new compounds of the present invention.

*Example I*

To a solution of 131 parts of α-mercaptosuccinic anhydride in 500 parts of benzene is added with good stirring over a period of fifteen minutes, a solution of 59 parts of hydrazine hydrate in 320 parts of ethyl alcohol at room temperature. The mixture is stirred for one hour at room temperature (after the initial slight temperature rise has subsided) and then refluxed for an additional hour. After cooling to room temperature, the solid product is filtered and washed with benzene. This product, α-mercaptosuccinic hydrazide, is obtained in high yield and has the empirical formula $C_4H_5O_2N_2S$.

*Example II*

The procedure of Example I is repeated using α-methylmercaptosuccinic anhydride as the reactant. α-methylmercaptosuccinic hydrazide corresponding to the formula $C_5H_7O_2N_2$ is obtained in high yield.

*Example III*

Using the procedure of Example I with α-trichloromethylthiosuccinic anhydride as a reactant, a good yield of α-trichloromethylthiosuccinic hydrazide is obtained.

*Example IV*

α-Propionylsuccinic anhydride is converted to α-propionylsuccinic hydrazide in high yield and high purity by the procedure of Example I.

*Example V*

By the procedure of Example I, the following succinic hydrazides are prepared by reaction of the corresponding succinic anhydride and hydrazine hydrate:

α-Benzoylsuccinic hydrazide
α-Acetoxysuccinic hydrazide
α-p-Tolyloxysuccinic hydrazide
α-Nitrososuccinic hydrazide
α-Nitrosuccinic hydrazide
α-Aminosuccinic hydrazide
α-Methylaminosuccinic hydrazide
α-Dimethylaminosuccinic hydrazide
α-Mercapto-α'-trichloromethylthiosuccinic hydrazide
α-Amino-α'-nitrosuccinic hydrazide
α-Acetyl-α'-benzoylsuccinic hydrazide A wide variety of radicals can be substituted in the 1,2,4,5-tetrahydropyridazine-3,6-dione structure to produce materials useful as fungicidal agents. Useful embodiments of our novel compounds comprise those in which one or more sulfur-containing groups are in the 4- or 5- or 4,5-positions. Such sulfur-containing groups include, for example, the sulfhydryl group, the trichloromethylthio group, and substituted mercapto group, wherein R′ is alkyl, such as, for example, methyl, ethyl, propyl, n-butyl, i-butyl, amyl, hexyl, dodecyl, benzyl, or phenylethyl or aryl or substituted aryl, typical examples of which are phenyl, tolyl, xylyl, and naphthyl.

Further typical examples of substituent groups which can be substituted in the 4-, 5-, or 4,5-positions of the compounds of our novel formulations comprise alkoxy, aryloxy, and acyloxy and aroyloxy groups. Typical examples of alkoxy groups which we employ comprise methoxy, ethoxy, propoxy, isopropoxy, allyloxy, 2′-methylhexoxy, β-chloroethoxy, β-aminoethoxy, and benzyloxy. As aryloxy substituents we can employ such typical groups as phenoxy, 4′-isopropylphenoxy, 2′,4′-dichlorophenoxy and 3'-nitrophenoxy. Among the acyloxy and aroyloxy groups we can employ in the 4-, 5-, or 4,5-positions of our 1,2,4,5-tetrahydropyridazine-3,6-diones, representative members include acetoxy, mono-, di-, and trichloroacetoxy, propionoxy, lauroyloxy, α-toluyloxy, benzoyloxy, toluyloxy, anisoyloxy, anthranoyloxy, 4'-chlorobenzoyloxy, and 2'-hydroxybenzyloxy, and the like.

Among nitrogen-containing groups which we can substitute in the α-, α'-, or α,α'-positions of our succinhydrazides, typical examples include the nitroso, nitro, and amino groups. The amino groups can be unsubstituted or can comprise the mono- and dialkyl and aryl or aryl alkyl amines. Illustrative of such amine groups are methylamino, ethylamino, hexylamino, N-methyl-N-ethylamino, isopropylamino, cyclohexylamino, 2'-methylhexylamino, β-hydroxyethylamino, anilino, N-phenyl-N-methylamino, piperidyl, morpholino, and pyridyl.

It is understood that mixtures of the negative radicals of the compounds of our invention can be co-substituted in many variations and combinations on the α-, α', or α,α'-positions of the succinhydrazides.

Substituted succinic anhydrides can be condensed with hydrazine hydrate according to the procedure of the foregoing examples to produce the succinhydrazides of the formulations of our invention. Thus, for example, when each of α-nitro-, α-fluoro-α'-nitro-, α-mercapto-, α-trichloromethylthio-, α-methoxy-α'-nitro-, α,α'-diacetoxy-, α-anilino-α'-iodo-, α-nitroso-α'-chloro-, α-methylmercapto-, α-(N-methyl-N-butylamino)-α'-nitro-, α-chloro-α'-butenyl-, α-cyclohexyl-α'-acetoxy-, and α-aminosuccinic anhydride is treated in benzene or an alcohol solution with a solution of hydrazine hydrate in ethyl alcohol, there is obtained, respectively, α-nitro-, α-fluoro-α'-nitro-, α-mercapto-, α-trichloromethylthio-, α-methoxy-α'-nitro-, α,α'-diacetoxy-, α-anilino-α'-iodo-, α-nitroso-α'-chloro-, α-methylmercapto-, α-(N-methyl-N-butylamino)-α'-nitro-, α-chloro-α'-butenyl-, α-cyclohexyl-α'-acetoxy-, and α-aminosuccinhydrazide.

The compounds of our invention can be employed as fungicides and for the prevention of the germination of the spores of fungi. To demonstrate the utility of the succinhydrazides of our invention as fungicidal compositions, we determined the concentration at which the germination of 50 percent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of our fungicides to protect these and other important agricultural crops. These tests were conducted as follows: 100 parts of the active ingredient was triturated with 1,000 parts of distilled water containing one part of the commercial dispersant Triton X-100. This standard suspension was thereupon further diluted with distilled water, and the concentration at which one-half of the fungi contained in a drop of water on a microscope slide were prevented from sporulating was determined. When the following typical examples of the compounds of our invention are so applied to cultures of these fungi, they are effective at low concentration: α-amino-, α-trichloromethylthio-, α-nitro-α'-chloro-, α-butylmercapto-, α-methylamino-α'-nitro-, α-nitroso-, α'-mercapto-, and α,α'-diacetoxysuccinhydrazide.

Other examples of the novel class of compounds which we have provided will be apparent, those specific examples enumerated herein being merely illustrative. Furthermore, other methods for their preparation will be apparent to those skilled in the art, and the foregoing examples of preparation are presented merely to illustrate one method for their preparation.

We claim:

1. As new compositions of matter, 1,2,4,5-tetrahydropyridazine-3,6-diones in which at least one of the methylene groups is substituted with a radical selected from the class consisting of sulfhydryl, alkyl mercaptans of 1 to 12 carbon atoms, aryl mercaptans of 6 to 10 carbon atoms, trichloromethylthio, alkyloxy of 1 to 8 carbon atoms.

2. A process for the manufacture of fungicidal 1,2,4,5-tetrahydropyridazine-3,6-diones which comprises reacting a member selected from the group consisting of hydrazine and hydrazine hydrate with a succinic anhydride wherein at least one of the methylene groups of said succinic anhydride is substituted with a radical of claim 1.

3. A fungicidal composition consisting essentially of the composition of claim 1, and a dispersant.

4. The method of treating materials susceptible to fungus attack with a fungicidal composition containing as the principal active ingredient 1,2,4,5-tetrahydropyridazine-3,6-diones in which at least one of the methylene groups is substituted with a radical selected from the class consisting of sulfhydryl, alkyl mercaptans of 1 to 12 carbon atoms, aryl mercaptans of 6 to 10 carbon atoms, trichloromethylthio, and alkyloxy of 1 to 8 carbon atoms.

References Cited in the file of this patent
UNITED STATES PATENTS
2,640,005    Ligett et al. _____ May 26, 1953